(12) United States Patent
Scharf et al.

(10) Patent No.: US 11,802,720 B2
(45) Date of Patent: Oct. 31, 2023

(54) PACKED-SCREEN TYPE MAGNETOCALORIC ELEMENT

(71) Applicant: Magneto B.V., Leiden (NL)

(72) Inventors: Florian Scharf, Frankfurt (DE); Lian Zhang, Delft (NL); Bernard Reesink, Winterswijk-Kotten (NL); David Van Asten, Utrecht (NL)

(73) Assignee: Magneto B.V., Leiden (NL)

( * ) Notice: Subject to any disclaimer, the term of this patent is extended or adjusted under 35 U.S.C. 154(b) by 0 days.

(21) Appl. No.: 17/979,010

(22) Filed: Nov. 2, 2022

(65) Prior Publication Data

US 2023/0046873 A1 Feb. 16, 2023

Related U.S. Application Data

(63) Continuation of application No. 15/736,155, filed as application No. PCT/EP2016/063034 on Jun. 8, 2016, now abandoned.

(30) Foreign Application Priority Data

Jun. 19, 2015 (EP) .................................. 15173006

(51) Int. Cl.
*F25B 21/00* (2006.01)
*H01F 1/01* (2006.01)

(52) U.S. Cl.
CPC ............. *F25B 21/00* (2013.01); *H01F 1/012* (2013.01); *F25B 2321/002* (2013.01); *F25B 2321/0021* (2013.01); *Y02B 30/00* (2013.01)

(58) Field of Classification Search
CPC ................ F25B 21/00; F25B 2321/002; F25B 2321/0022; F25B 2321/0023; H01F 1/017; Y02B 30/66
See application file for complete search history.

(56) References Cited

U.S. PATENT DOCUMENTS

| 2,898,091 A | 8/1959 | Verbeek |
| 4,651,808 A | 3/1987 | Mizuno |

(Continued)

FOREIGN PATENT DOCUMENTS

| EP | 1463068 A2 | 9/2004 |
| EP | 2796811 A1 | 10/2014 |

(Continued)

OTHER PUBLICATIONS

Lei et al., "Modeling and comparison of packed screen regenerators for active magnetocaloric refrigeration", In Proceedings of the 6th IIF-IIR International Conference on Magnetic Refrigeration, International Institute of Refrigeration, Sep. 2014.

*Primary Examiner* — Jenna M Hopkins
(74) *Attorney, Agent, or Firm* — Harness, Dickey & Pierce, P.L.C.

(57) ABSTRACT

A magnetocaloric lattice element formed by fibres of magnetocaloric material, wherein the fibres are arranged in respective parallel lattice planes, each fibre having a respective mass of magnetocaloric material, the fibres of given lattice plane do not contact each other but each fibre of a given lattice plane is attached to at least two fibres in a next neighbouring lattice place, and wherein the magnetocaloric lattice element exhibits exactly one predominant mass-weighted direction of longitudinal fibre extension.

16 Claims, 12 Drawing Sheets

(56) References Cited

U.S. PATENT DOCUMENTS

Figure 1:
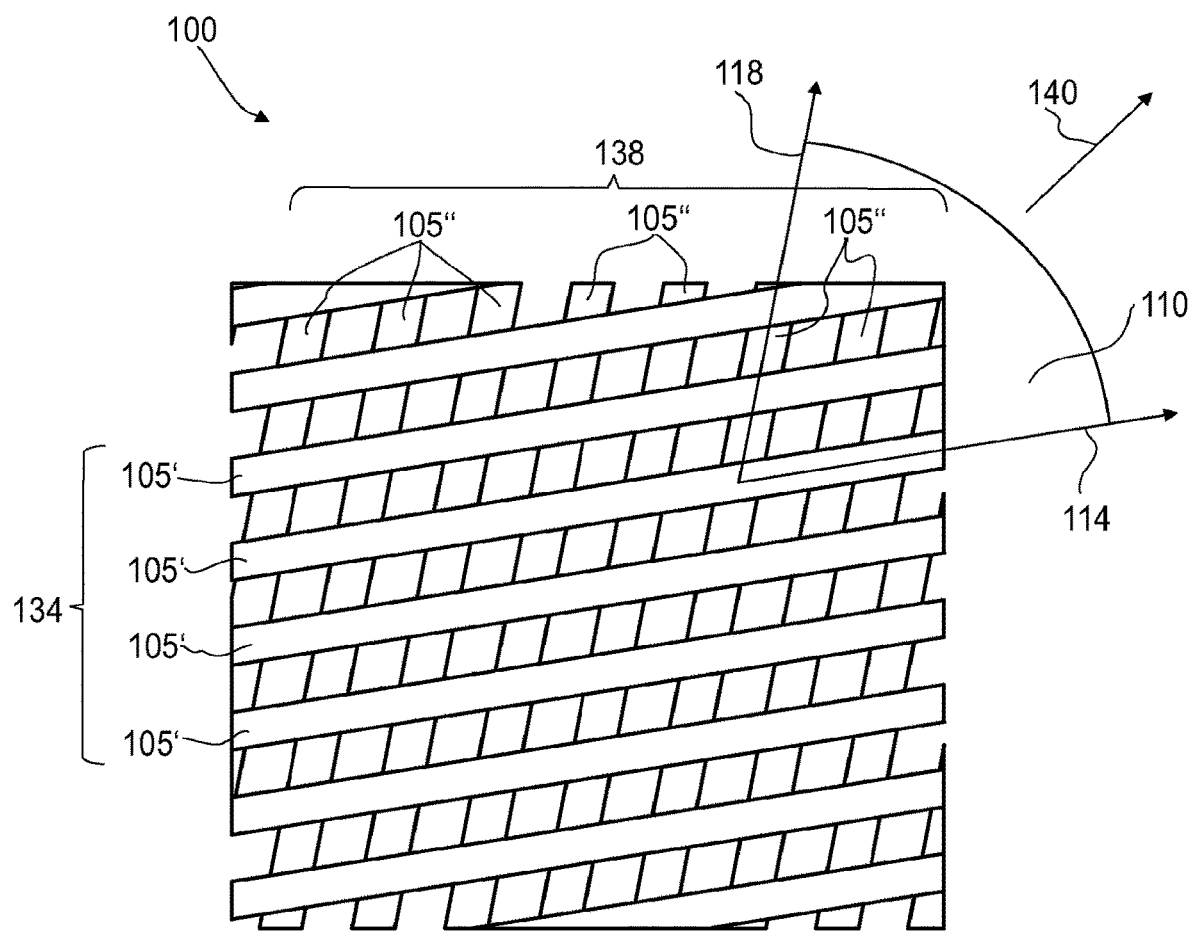

| | | | |
|---|---|---|---|
| 5,332,029 A | 7/1994 | Tokai et al. | |
| 5,429,177 A * | 7/1995 | Yaron | F02G 1/0445 165/10 |
| 5,593,517 A | 1/1997 | Saito et al. | |
| 5,897,963 A | 4/1999 | Seuntjens | |
| 6,022,486 A * | 2/2000 | Tokai | F02G 1/0445 165/4 |
| 6,131,644 A | 10/2000 | Kohara et al. | |
| 6,336,978 B1 | 1/2002 | Tokai et al. | |
| 6,475,935 B1 | 11/2002 | Ishizaki et al. | |
| 6,595,004 B1 | 7/2003 | Ghoshal | |
| 6,680,663 B1 | 1/2004 | Lee et al. | |
| 6,732,785 B2 | 5/2004 | Mitchell | |
| 6,825,681 B2 | 11/2004 | Feder et al. | |
| 6,854,509 B2 * | 2/2005 | Mitchell | F25B 9/14 165/4 |
| 7,148,777 B2 | 12/2006 | Chell et al. | |
| 7,168,255 B2 | 1/2007 | Saito et al. | |
| 8,537,053 B2 | 9/2013 | Viala et al. | |
| 8,991,170 B2 | 3/2015 | Sherlock | |
| 9,175,885 B2 | 11/2015 | Katter | |
| 9,810,454 B2 | 11/2017 | Tasaki et al. | |
| 2001/0025494 A1 | 10/2001 | Okamura et al. | |
| 2003/0010473 A1 | 1/2003 | Mitchell | |
| 2003/0051774 A1* | 3/2003 | Saito | H01F 1/015 148/302 |
| 2005/0068140 A1 | 3/2005 | Huang et al. | |
| 2005/0110602 A1 | 5/2005 | Westphal | |
| 2007/0144181 A1 | 6/2007 | Kitanovski et al. | |
| 2007/0283994 A1 | 12/2007 | McPherson | |
| 2008/0078184 A1 | 4/2008 | Saito et al. | |
| 2010/0050657 A1* | 3/2010 | Jendrusch | F25B 21/00 62/3.1 |
| 2010/0107654 A1 | 5/2010 | Rowe et al. | |
| 2010/0116471 A1 | 5/2010 | Reppel et al. | |
| 2011/0048031 A1 | 3/2011 | Barve et al. | |
| 2011/0048690 A1 | 3/2011 | Reppel et al. | |
| 2011/0173993 A1 | 7/2011 | Muller et al. | |
| 2011/0308258 A1 | 12/2011 | Smith et al. | |
| 2012/0031108 A1 | 2/2012 | Kobayashi et al. | |
| 2012/0031109 A1 | 2/2012 | Vetrovec | |
| 2012/0073307 A1 | 3/2012 | Kaji et al. | |
| 2012/0272666 A1 | 11/2012 | Watanabe et al. | |
| 2013/0232993 A1 | 9/2013 | Saito et al. | |
| 2014/0113828 A1 | 4/2014 | Gilbert et al. | |
| 2014/0338365 A1 | 11/2014 | Tasaki et al. | |
| 2015/0033763 A1 | 2/2015 | Saito et al. | |
| 2017/0297760 A1 | 10/2017 | Nilsson | |
| 2018/0252445 A1 | 9/2018 | Ueno et al. | |

FOREIGN PATENT DOCUMENTS

| | | |
|---|---|---|
| EP | 2833085 A1 | 2/2015 |
| FR | 2578911 | 9/1986 |
| JP | S5924188 A | 2/1984 |
| JP | H01136361 U | 9/1989 |
| JP | 01-310269 A | 12/1989 |
| JP | H1020591 A | 1/1998 |
| JP | 2002106999 A | 4/2002 |
| JP | 2009507168 A | 2/2009 |
| JP | 2009515135 A | 4/2009 |
| JP | 2018146154 A | 9/2018 |
| JP | 2019-32145 A | 2/2019 |
| WO | 98/18880 A1 | 5/1998 |
| WO | 00/38831 A1 | 7/2000 |
| WO | 03/016794 A1 | 2/2003 |
| WO | 2010/086399 A1 | 8/2010 |
| WO | 2012/157708 A1 | 11/2012 |

* cited by examiner

PACKED-SCREEN TYPE MAGNETOCALORIC ELEMENT

The invention relates to a magnetocaloric lattice element, to a magnetocaloric regenerator, to a magnetocaloric heat pump, to a cooling device, to a magnetocaloric power generator and to method for operating a magnetocaloric heat pump.

Magnetocaloric materials change their temperature upon an application and removal of an external magnetic field. This behavior is the basis for development of magnetic cooling systems. Furthermore, the magnetocaloric effect can be used for power generation.

The magnetocaloric effect occurs under application of an external magnetic field to a suitable magnetocaloric material and under an ambient temperature in the vicinity of its Curie temperature. The applied external magnetic field causes an alignment of the randomly aligned magnetic moments of the magnetocaloric material from a disordered paramagnetic phase to an ordered ferromagnetic phase and thus a magnetic phase transition, which can also be described as an induced increase of the Curie temperature of the material above the ambient temperature. This magnetic phase transition implies a loss in magnetic entropy $\Delta S_{mag}$ and in an adiabatic process (thermal isolation from the ambient temperature) leads to an increase in the entropy contribution of the crystal lattice of the magnetocaloric material by phonon generation in order to conserve entropy under the adiabatic condition. As a result of applying the external magnetic field, therefore, a to a temperature rise ($\Delta T$) of the magnetocaloric material occurs.

In technical cooling applications, this additional heat is removed from the material by heat transfer to an ambient heat sink in the form or a heat transfer medium. Water is an example of a heat transfer medium used for heat removal from the magnetocaloric material.

Subsequently removing the external magnetic field can be described as a decrease of the Curie temperature back below the ambient temperature, and thus allows the magnetic moments reverting back to a random arrangement. The external magnetic field is removed under adiabatic conditions, i.e., thermal isolation from the ambient temperature, which means that the overall entropy within the system stays unchanged. Since the magnetic entropy increases to its starting level without the external magnetic field, the entropy contribution of the crystal lattice of the magnetocaloric material itself is reduced, and under adiabatic process conditions thus results in a cooling of the magnetocaloric material below the ambient temperature. Thus, the temperature of the magnetocaloric material falls below the ambient temperature.

The described process cycle including magnetization and demagnetization is typically performed periodically in device applications.

The magnetocaloric effect can also be used for power conversion, in particular to convert heat generated during the described process cycle into electricity.

T. Lei et al. studied a cooling power and a pressure drop for mesh shaped magnetocaloric elements in magnetocaloric refrigerators ("*Modelling and comparison studies of packed screen regenerators for active magnetocaloric refrigeration*", 6$^{th}$ IIF-IIR International Conference on Magnetic Refrigeration, Jul. 9, 2014-Oct. 9, 2014). As a result, Lei et al. stated that packed-screen regenerators with an approximate mesh number between 75-100 wires/inch provide a sufficient heat transfer and a moderate pressure drop and thus give the best performance. Compared to packed sphere regenerators, Lei et al. found that packed-screen regenerators can achieve a larger cooling power as well as a lower pressure drop.

The present invention covers different aspects. In a first aspect, the invention provides a mesh-shaped magnetocaloric element of the packed-screen type, which herein is referred to as a magnetocaloric lattice element. A second aspect is formed by a magnetocaloric regenerator; in a third aspect, the present invention provides a magnetocaloric heat pump. A cooling device is a fourth aspect of the invention. A magnetocaloric power generator forms a fifth aspect of the invention.

According to first aspect of the invention, thus, a magnetocaloric lattice element is provided. The magnetocaloric lattice element is formed by fibres of magnetocaloric material, wherein the fibres are arranged in lattice planes, which are parallel to each other, each fibre having a respective mass amount of magnetocaloric material, the fibres of any given lattice plane do not contact each other but the fibres of the given lattice plane contact at least two respective other fibres of a next neighbouring lattice plane, and wherein the magnetocaloric lattice element exhibits exactly one predominant mass-weighted direction of longitudinal fibre extension.

The magnetocaloric element according to the first aspect of the invention contains fibres of magnetocaloric material that are arranged in planes. Fibres of a given plane do not contact each other. However, the fibres are in mechanical contact with at least two fibres of a next neighbouring plane. An at least roughly regular structure of this type is herein referred to as a magnetocaloric lattice structure of packed fibres, and the different planes of fibres are referred to as lattice planes. The magnetocaloric element of the first aspect is therefore also called a magnetocaloric lattice element. As such, the magnetocaloric lattice element forms a magnetocaloric element of high structural stability. The magnetocaloric element may also be described as a magnetocaloric element of the packed-screen type.

Since the fibres of a given lattice plane do not contact each other, internal openings are formed in each lattice plane, which in operation of application devices incorporating the magnetocaloric lattice elements enables a fluid flow through the openings for heat-transfer between the fibres and the fluid. Embodiments of the magnetocaloric lattice element achieve an effective heat transfer in cooling applications with a low fluid resistance. In other words, such embodiments of the magnetocaloric lattice elements structure achieve a low fluidic pressure loss in comparison, for instance, with a porous magnetocaloric element made of packed spheres.

The magnetocaloric lattice element of the first aspect of the present invention further features a predominant mass-weighted direction of longitudinal fibre extension. As will be elucidated below, the predominant mass-weighted direction of longitudinal fibre extension forms the most suitable direction for magnetization of the magnetocaloric lattice element. Suitable relative alignment of the magnetocaloric lattice element and the external magnetic field with respect to the predominant mass-weighted direction of longitudinal fibre extension thus leads to a particularly high magnetization of the magnetocaloric lattice element.

The magnetocaloric lattice element of the present invention is based on the recognition that its magnetization characteristic arises in view of a demagnetizing effect of any section of its magnetocaloric fibres that is not oriented along a direction of an external magnetic field. The demagnetizing effect is a reduction of a maximal magnetization which could be generated in a magnetocaloric material of the same volume if all fibres were infinitesimally thin and arranged in a field direction of an external magnetic field. Thus, the demagnetizing effect is a reduction of the magnetization caused by a given geometrical shape and arrangement of the fibres of magnetocaloric material. Starting from exact alignment between the direction of the external magnetic field and a given orientation of a fibre the demagnetizing effect increases with increasing angle between the direction of the external magnetic field and an orientation of the fibre. Fibres or longitudinal fibre sections that are oriented perpendicular to the magnetization direction, i.e., to the direction of the external magnetic field, have the largest (mass-weighted) demagnetizing impact.

Thus, when arranged in alignment of its predominant mass-weighted direction of longitudinal fibre extension with an external magnetic field to be provided in application devices, the magnetocaloric lattice element according to the first aspect of the invention achieves an advantageous, particularly high magnetization of the magnetocaloric material, and as a consequence improves the performance of the application device, such as a magnetocaloric heat pump, cooling device or power generator.

In the following, embodiments of the magnetocaloric lattice element according to the first aspect of the invention will be described.

A fibre shape can generally be described as having a longitudinal fibre extension which is larger than any lateral fibre extension, the latter referring to an extension in a direction that is perpendicular to the longitudinal fibre extension. A typical example of a fibre shape is a cylindrical shape, which includes as different variants fibres having a circular, ellipsoidal, oval or rectangular cross-sectional shape in planes that are perpendicular to the longitudinal fibre extension. However, the fibres do not necessarily exhibit a cylindrical shape. For example, the lateral fibre extension of the fibre may vary along the longitudinal fibre extension of the fibre.

In an embodiment of the magnetocaloric lattice element, an extension of the fibres in a direction perpendicular to their longitudinal fibre extension, i.e., in a lateral direction is between 50 µm and 800 µm. In some rectangular or ellipsoidal cross-sectional fibre shapes, the lateral extension varies in different lateral directions. In such embodiments, the mentioned values refer to a preferred maximum lateral extension.

In one variant, all fibres of the magnetocaloric lattice element have essentially the same lateral extension perpendicular to their longitudinal fibre extension. The lateral fibre extension is different for different fibres in other variants.

To achieve the packed-screen, mesh or lattice shape, the magnetocaloric lattice element as a whole has fibres extending in least two directions. In some embodiments, the direction of longitudinal fibre extension is different in different sections of a given fibre. Examples will be discussed further below.

Typically, a fibre is made of a single magnetocaloric material. In some embodiments, however, the fibres are not homogenous in their material composition. Different fibre sections contain more or less magnetocaloric material, or different magnetocaloric materials.

The magnetocaloric lattice element may contain any suitable number of fibres. The minimum number of fibres required to form the magnetocaloric lattice element is four fibres.

Lattice planes of the magnetocaloric lattice element are planar in some embodiments. However, the term lattice plane is not restricted to a crystallographic meaning implying strict planar extension. Lattice planes of the magnetocaloric lattice element have the form of curved surfaces in other embodiments.

There are different ways of achieving a magnetocaloric lattice element with a predominant mass-weighted direction of longitudinal fibre extension. As mentioned, in the magnetocaloric lattice element of the invention, there is only one such direction. In a preferred embodiment of the magnetocaloric lattice element, the achievement of a predominant mass-weighted direction of longitudinal fibre extension can be described as follows: if each fibre is regarded as being partitioned into longitudinal fibre segments each having a segment mass and a longitudinal segment extension along a respective longitudinal segment direction, the predominant mass-weighted direction of longitudinal fibre extension is defined by the requirement that a weighted sum of all scalar projections of the respective longitudinal segment extensions of all fibre segments onto this predominant direction of longitudinal fibre extension is larger than the corresponding weighted sum of all scalar projections of the respective longitudinal segment extensions of all fibre segments onto any other direction of longitudinal segment extension, wherein each fibre segment is weighted in the weighted sum in proportion to its respective segment mass.

In this embodiment, scalar projection means that a longitudinal segment n with a longitudinal segment extension along a respective longitudinal segment direction can be regarded as vector $\vec{a}_n$ with length 1, and the corresponding scalar projection on the predominant mass-weighted direction of longitudinal fibre extension $\vec{e_{PMD}}$ can be written as $$\vec{a}_n \cdot \vec{e}_{PM} = |\vec{a}_n| \cos \theta_n = a_n \cos \theta_n,$$

where $\theta_n$ is the angle between the respective longitudinal segment direction and the predominant mass-weighted direction of longitudinal fibre extension. Therefore, in this preferred embodiment the predominant mass-weighted direction of longitudinal fibre extension $\vec{e_{PMD}}$ satisfies the following relation:

$$\vec{e_{PMD}} = \left\{ \vec{e_D} : |\vec{e_D}| = 1; f(\vec{e} = \vec{e_D}) = \max\left( \sum_n m_n \vec{a}_n \cdot \vec{e} \right) \right\}, \quad (1)$$

where $\vec{e}_D$ is a three-dimensional vector and $m_n$ is the segment mass of the longitudinal segment n. Thus, Eq. (1) defines the fact that the predominant mass-weighted direction of longitudinal fibre extension is exactly that direction, or that vector with length 1, for which a weighted sum of all scalar projections of the respective longitudinal segment extensions of all fibre segments onto this predominant direction of longitudinal fibre extension shows a maximum.

Since the longitudinal fibre segments exhibit a finite size the sum in Eq. (1) has a finite number of summands. More generally speaking, a mathematical formulation using an integral could be used for certain embodiments, for which fibres have a longitudinal extension following, e.g., a cosine shape.

In a further preferred embodiment of the magnetocaloric lattice element, the predominant mass-weighted direction of longitudinal fibre extension is achieved as follows: all fibres belong to a first or second set of fibres and the fibres of the first set of fibres all extend along a common first longitudinal direction of fibre extension and the fibres of the second set of fibres all extend along a common second longitudinal direction of fibre extension different from the first longitudinal direction. Hence, in this variant of this further preferred embodiment the fibres of the magnetocaloric lattice element extent into two directions, so that there are just two different longitudinal segment directions for determining the predominant mass-weighted direction of longitudinal fibre extension according to Eq. (1). Parallel fibres require less effort in production and provide a high structural stability. In a further variant of this embodiment, each lattice plane provides fibres of a respective set of fibres all extend along a common respective longitudinal direction of fibre extension. In an example of this further variant, neighbouring planes alternate between fibres of the first and second set of fibres. This can lead to a basically regular structure of the magnetocaloric lattice element and therefore provide a high structural stability.

In a group of such embodiments of the magnetocaloric lattice element according to the first aspect of the invention, a lattice angle between the first longitudinal direction and the second longitudinal direction is a sharp angle between 5° and 85° (arc degrees). An even smaller lattice angle, i.e. a lattice angle below 5°, would lead to a high pressure loss of a heat transfer medium that flows through the magnetocaloric lattice element. An even larger lattice angle, i.e., a lattice angle approaching 90°, increases the already described demagnetizing effect of the magnetocaloric lattice element in case of fibres substantially equal in shape and number for the first and second longitudinal directions. The sharp angle preferably is in a range between 20° and 70°, even more preferably between 40° and 60°.

In a variant of this embodiment, the fibres have equal sizes and are produced with the same magnetocaloric material and all belong to either the first or second set of fibres. As a consequence, the predominant mass-weighted direction of longitudinal fibre extension in this variant is basically along a bisection of the sharp lattice angle with respect to the first direction of the first set of fibres and to the second direction of the second set of fibres.

In a further embodiment of the magnetocaloric lattice element, the first set of fibres has a smaller mass amount of magnetocaloric material than the second set of fibres. The different mass amounts cause the predominant mass-weighted direction of longitudinal fibre extension to be influenced more strongly by the longitudinal direction of fibre extension of the second set of fibres than that of first set of fibres. Using such different mass amounts of magnetocaloric material can be advantageous in order to reduce the pressure loss of a heat transfer fluid flowing through the magnetocaloric lattice element in case of using the magnetocaloric lattice element within a heat pump, a cooling device or a power generator.

In a variant of this embodiment, a total number of fibres in the first set of fibres is smaller than a total number of fibres in the second set of fibres. In an example of this variant, each of the fibres belongs to either the first or second set of fibres and the first and second sets of fibres are oriented perpendicular to each other. Thus, in this example the predominant mass-weighted direction of longitudinal fibre extension is oriented along the longitudinal direction of fibre extension of the second set of fibres. In a further variant, the first set of fibres is at least two times smaller than the second set of fibres, considering a cross-sectional surface area having a surface vector parallel to the longitudinal extension of the respective fibre segments. In an example of this variant, all fibres belong to the first and second set of fibres and the first and second sets of fibres are oriented perpendicular to each other. Thus, in this example the predominant mass-weighted direction of longitudinal fibre extension is oriented along the longitudinal direction of fibre extension of the second set of fibres.

The magnetocaloric lattice element is for instance formed by extruding a highly loaded paste comprising magnetocaloric material, using a moving nozzle so that the fibres of the magnetocaloric lattice element can be produced layer by layer. The paste comprising the magnetocaloric material may additionally comprise a solvent, such as water, a binder and additives. In some variants, a defoamer is also added to avoid air bubbles in the paste. In other variants of fabrication, the magnetocaloric lattice element is formed by a three-dimensional-printing process.

In one embodiment of the magnetocaloric lattice element, all fibres consist of the same magnetocaloric material. In a further embodiment, the magnetocaloric lattice element consists of at least two different magnetocaloric materials. In a variant of this embodiment, the magnetocaloric material in respective subsequent planes exhibits a series of decreasing Curie-temperatures of the respective magnetocaloric materials. Such a series of decreasing Curie-temperatures in subsequent planes can allow an energy efficient cooling of a cooling device comprising the magnetocaloric lattice element far below an ambient temperature of the cooling device.

According to a second aspect, the invention relates to a magnetocaloric regenerator, comprising
  a regenerator housing,
  a magnetocaloric lattice element according to at least one embodiment of the first aspect of the invention in the regenerator housing, and
  a fluid channel system configured to guide a flow of a fluid through the magnetocaloric lattice element.

The magnetocaloric regenerator according to the second aspect of the invention shares the advantages of the magnetocaloric lattice element of the first aspect of the invention.

The magnetocaloric regenerator further provides a fluid channel system that in operation of the regenerator achieves a flow of a heat transfer fluid through the magnetocaloric lattice element, according to a desired process cycle, for instance in an application as a magnetocaloric cooling device, heat pump or power generator.

According to a third aspect, the invention relates to a magnetocaloric heat pump, comprising
  a magnetocaloric lattice element according the first aspect of the invention, or one of its embodiments, or a magnetocaloric regenerator according to the second aspect of the invention, or one of its embodiments, and further comprising
  a magnet assembly for applying an external magnetic field to the magnetocaloric lattice element, wherein
  the magnetocaloric lattice element and the magnet assembly are configured to be mutually arranged for applying the external magnetic field to the magnetocaloric lattice element with a field direction which is parallel to the predominant mass-weighted direction of longitudinal fibre extension.

The magnetocaloric heat pump according to the third aspect of the invention shares the advantages described in the context of the magnetocaloric lattice element according to the first aspect of the invention.

The magnetocaloric heat pump further achieves a mutual arrangement of the magnetocaloric lattice element and the magnet assembly in an advantageous orientation of the predominant mass-weighted direction of longitudinal fibre extension in alignment parallel to the direction of the generated external magnetic field within the magnetocaloric heat pump.

The heat pump is in one embodiment configured to allow different relative alignment positions achieving different ones of a plurality of possible field directions with respect to the predominant mass-weighted direction of longitudinal fibre extension of the magnetocaloric lattice element in different operational alignment positions. An optimum of the magnetocaloric effect and its desired technical impact is achieved in parallel alignment. However, a reduced effect can also be achieved if only a field component of the external magnetic field, which is applied to the magnetocaloric lattice element, exhibits the field direction parallel to the predominant mass-weighted direction of longitudinal fibre extension.

In an embodiment of the magnetocaloric heat pump according to the third aspect of the invention, the magnetocaloric heat pump further comprises a magnetocaloric lattice element,
 wherein all fibres belong to the first or second set of fibres and the fibres of a first set of fibres all extend along a common first longitudinal direction of fibre extension and the fibres of a second set of fibres all extend along a common second longitudinal direction of fibre extension different from the first longitudinal direction,
 wherein a lattice angle between the first longitudinal direction and the second longitudinal direction is a sharp angle between 5° and 85°, preferably between 20° and 70°, preferable between 40° and 60°,
 wherein all fibres have a same respective mass amount of magnetocaloric material, and
 wherein the magnetocaloric lattice element and the magnet assembly are configured to be mutually arranged for applying the external magnetic field to the magnetocaloric lattice element with a field direction which is oriented along a bisector of the sharp lattice angle between the first longitudinal direction and the second longitudinal direction.

In this embodiment, the predominant mass-weighted direction of longitudinal fibre extension is oriented along the bisector of the sharp lattice angle between the first longitudinal direction and the second longitudinal direction.

In a further embodiment of the magnetocaloric heat pump, the magnetocaloric heat pump comprises a magnetocaloric lattice element,
 wherein all fibres belong to the first or second set of fibres and the fibres of the first set of fibres all extend along a common first longitudinal direction of fibre extension and the fibres of the second set of fibres all extend along a common second longitudinal direction of fibre extension different from the first longitudinal direction,
 wherein the first set of fibres includes a smaller mass amount of magnetocaloric material than the second set of fibres, and
 wherein the first longitudinal direction is perpendicular to the second longitudinal direction and wherein the magnetocaloric lattice element and the magnet assembly are configured to be mutually arranged for applying the external magnetic field to the magnetocaloric lattice element with a field direction which is oriented along the second longitudinal direction which forms the predominant mass-weighted direction of longitudinal fibre extension.

In an embodiment of the magnetocaloric heat pump, the magnetocaloric heat pump further comprises a controlling unit arranged and configured to control a mutually arrangement of the magnet assembly and the magnetocaloric lattice element for applying the external magnetic field to the magnetocaloric lattice element with a field direction which is parallel to the predominant mass-weighted direction of longitudinal fibre extension. In this embodiment, the controlling unit provides an advantageous orientation of the magnetocaloric lattice element and of the magnet assembly with respect to each other, automatically and/or manually. In a variant of this embodiment, the controlling unit comprises a processor device which is configured to compare the orientation of the magnetocaloric lattice element and of the magnet assembly with reference values stored in the processor device. In a further variant, the controlling unit comprises a visual indicator that is configured to show the user what changes of the orientation of the magnetocaloric lattice element and of the magnet assembly should be executed manually. In another further variant, the controlling unit automatically executes a periodic motion of the magnetocaloric lattice element according to a periodic motion of the magnet assembly.

According to a fourth aspect, the invention relates to a cooling device, comprising a magnetocaloric lattice element according to at least one of the embodiments of the first aspect of the invention.

The cooling device according to the fourth aspect of the invention shares the advantages described in the context of the magnetocaloric lattice element according to the first aspect of the invention.

In an embodiment of the cooling device, the cooling device comprises the magnetocaloric regenerator according to at least one of the embodiments of the second aspect of the invention.

In a further embodiment of the cooling device, the cooling device comprises the magnetocaloric heat pump according to at least one of the embodiments of the third aspect of the invention.

In a preferred embodiment, the cooling device performs a process cycle including magnetization and demagnetization of the magnetocaloric lattice element. In a variant of this embodiment, the cooling device performs a process cycle as explained above, exhibiting a first phase and a second phase of magnetocaloric cooling.

According to a fifth aspect, the invention relates to a magnetocaloric power generator, comprising a magnetocaloric lattice element according to at least one of the embodiments of the first aspect of the invention.

In an embodiment of the magnetocaloric power generator according to the fifth aspect of the invention, the magnetocaloric power generator comprises a heating reservoir and a cooling reservoir, which are arranged and configured to heat and cool the magnetocaloric lattice element to change its magnetic field periodically, and a coil, which is arranged at the magnetocaloric lattice element in order to provide an electrical current which is induced by changes in the magnetic field of the magnetocaloric lattice element.

According to a sixth aspect, the invention relates to a method for operating a magnetocaloric heat pump. The method comprises the steps of
 providing a magnetocaloric lattice element according to at least one of the embodiments of the first aspect of the invention;
 providing a magnet assembly for applying an external magnetic field to the magnetocaloric lattice element;

arranging the magnetocaloric lattice element and the magnet assembly for applying the external magnetic field to the magnetocaloric lattice element with a field direction which is parallel to the predominant mass-weighted direction of longitudinal fibre extension.

The method according to the fifth aspect of the invention shares the advantages described in the context of the magnetocaloric lattice element according to the first aspect of the invention.

It shall be understood that the magnetocaloric lattice element of the first aspect of the invention, also defined in claim 1, the magnetocaloric regenerator of the second aspect, also defined in claim 9, the magnetocaloric heat pump of the third aspect, also defined in claim 10, the cooling device of the fourth aspect, also defined in claim 13, the magnetocaloric power generator of the fifth aspect, also defined in claim 14, and the method for operating a magnetocaloric lattice element, also defined in claim 15, have similar or identical embodiments.

Further embodiments will be described below with reference to the enclosed drawings.

Figure 2:
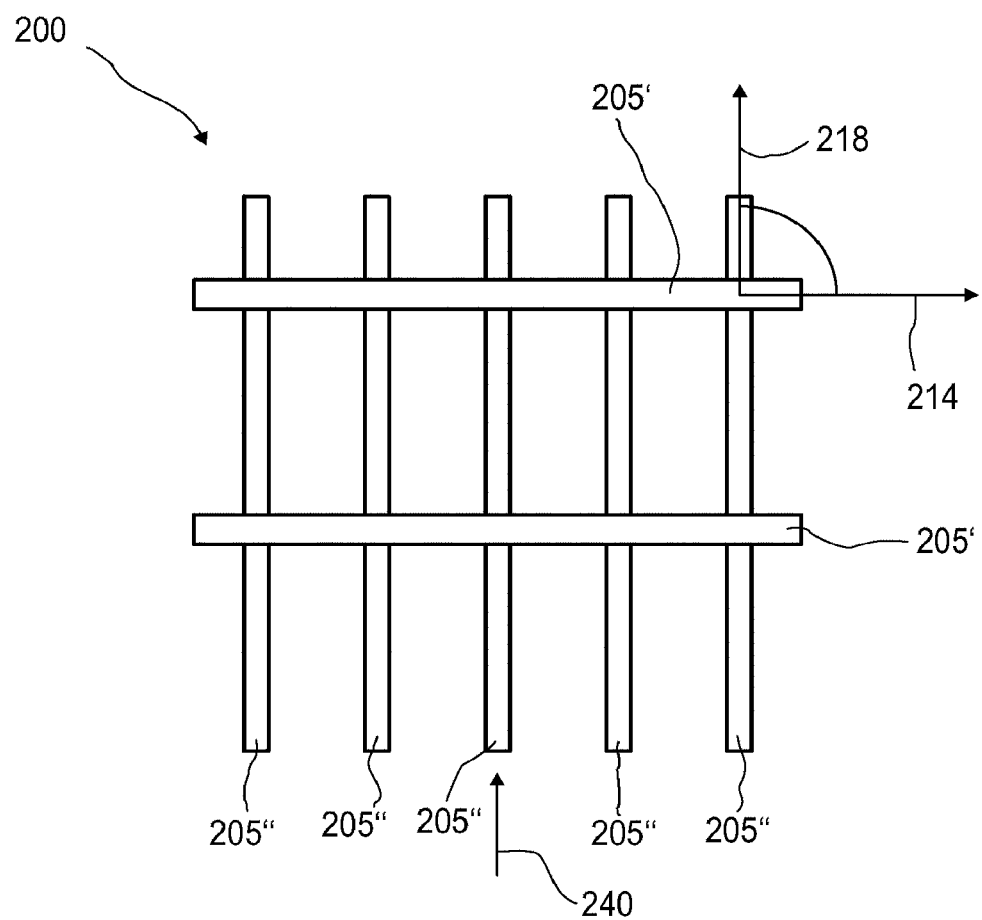
Figure 3:
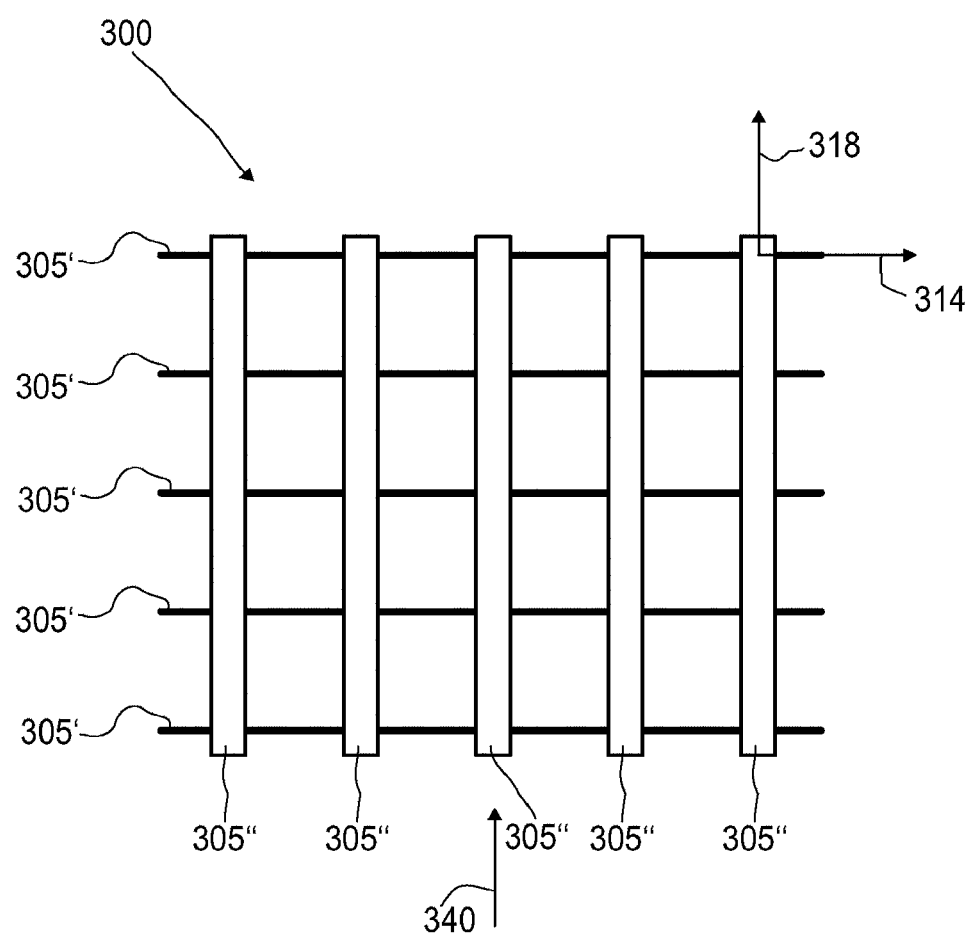
Figure 4A:
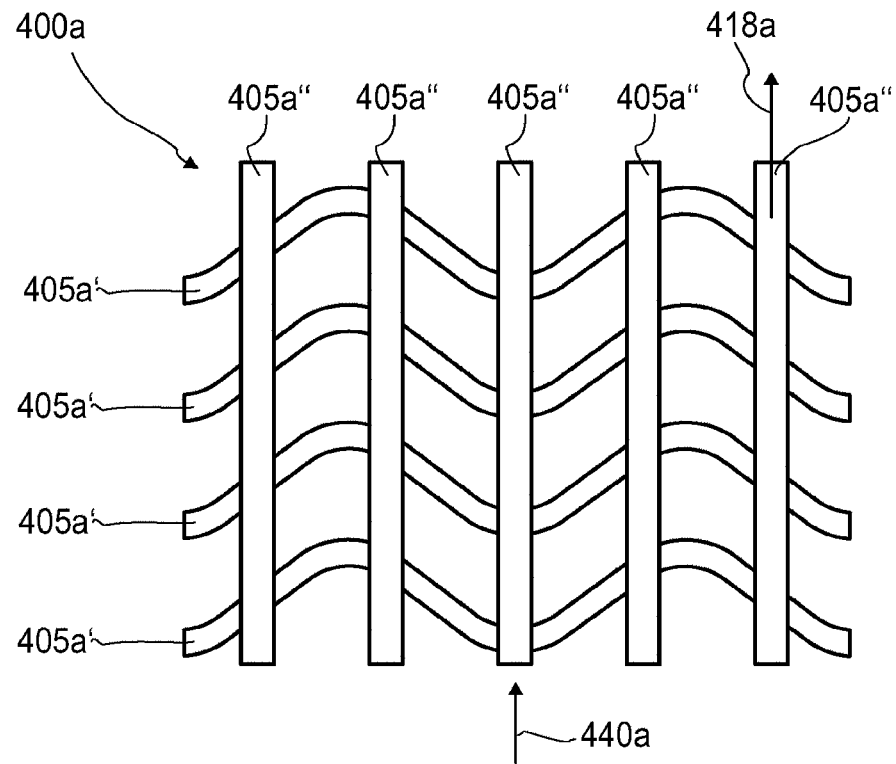
Figure 5:
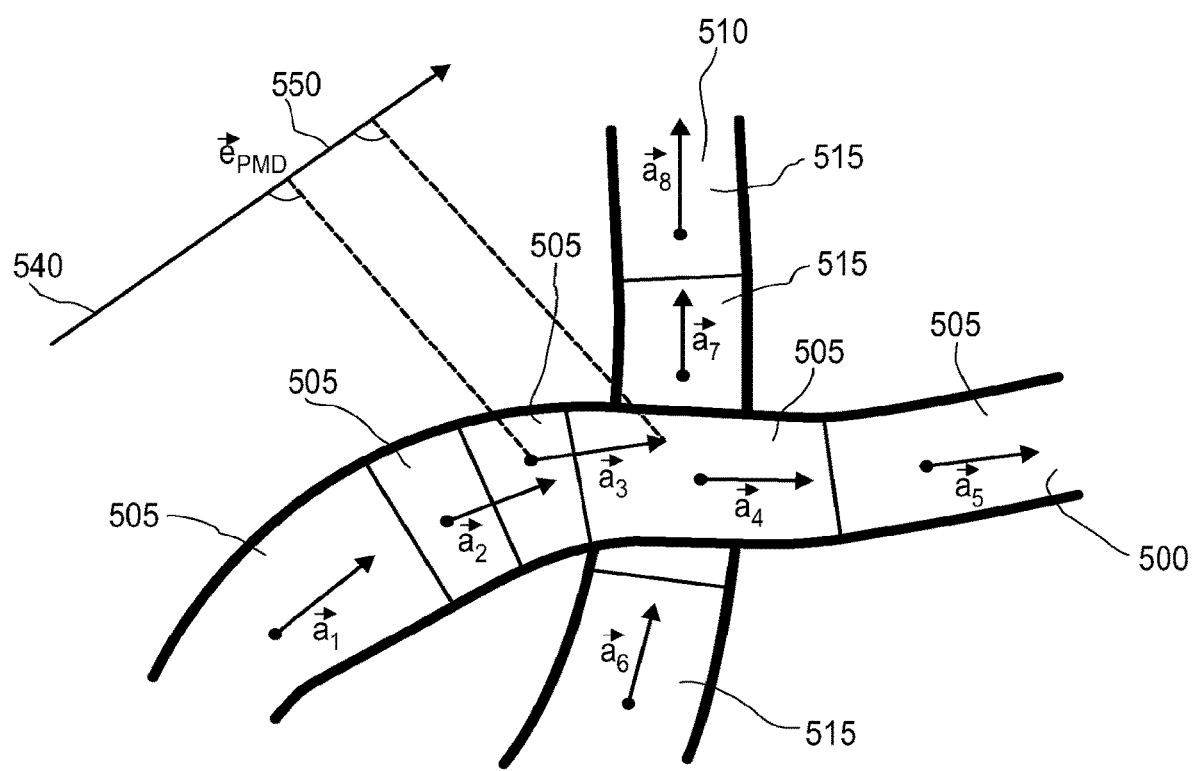
Figure 6B:
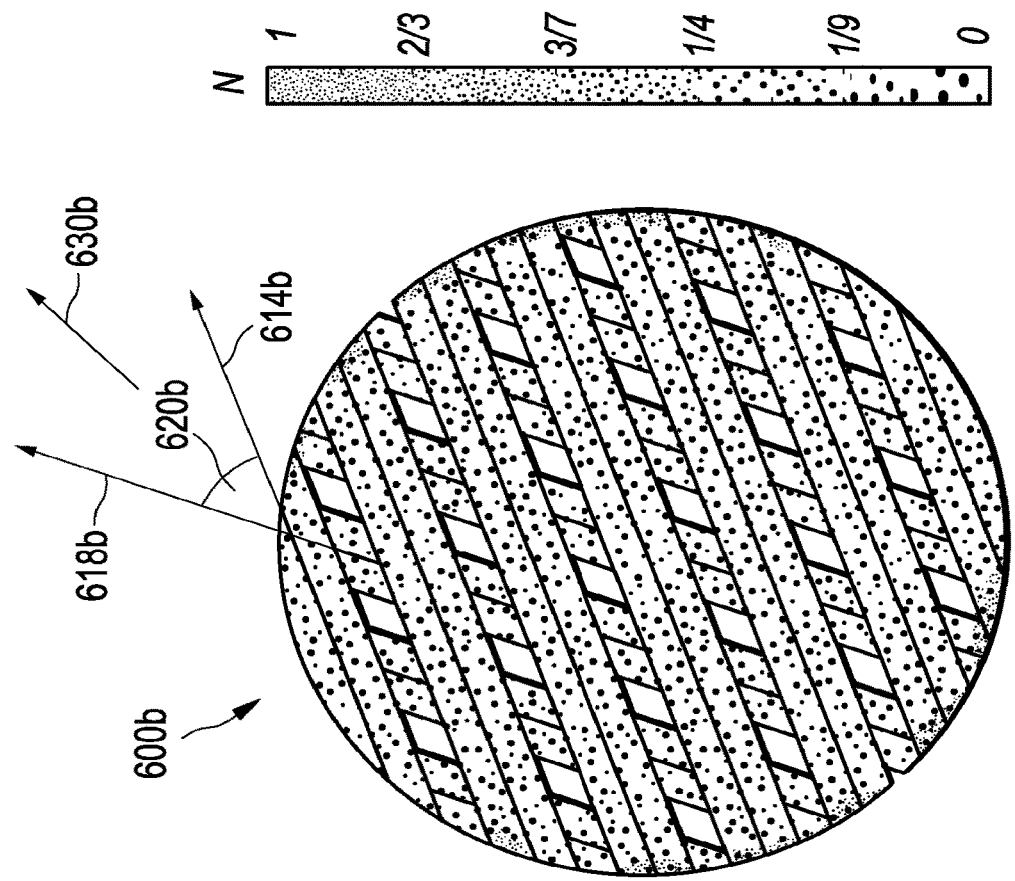
Figure 6A:
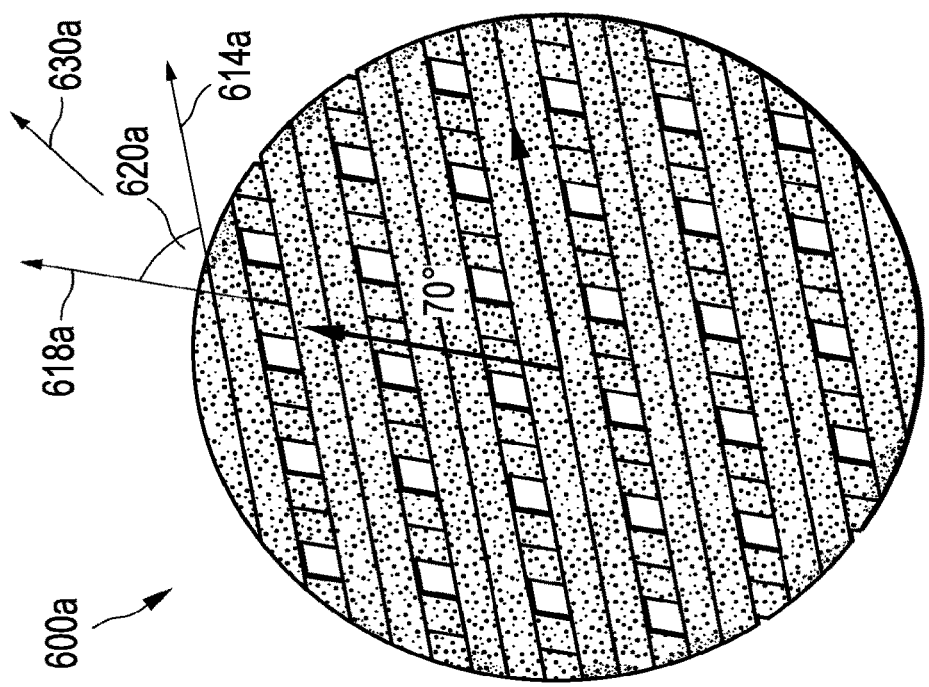
Figure 6D:
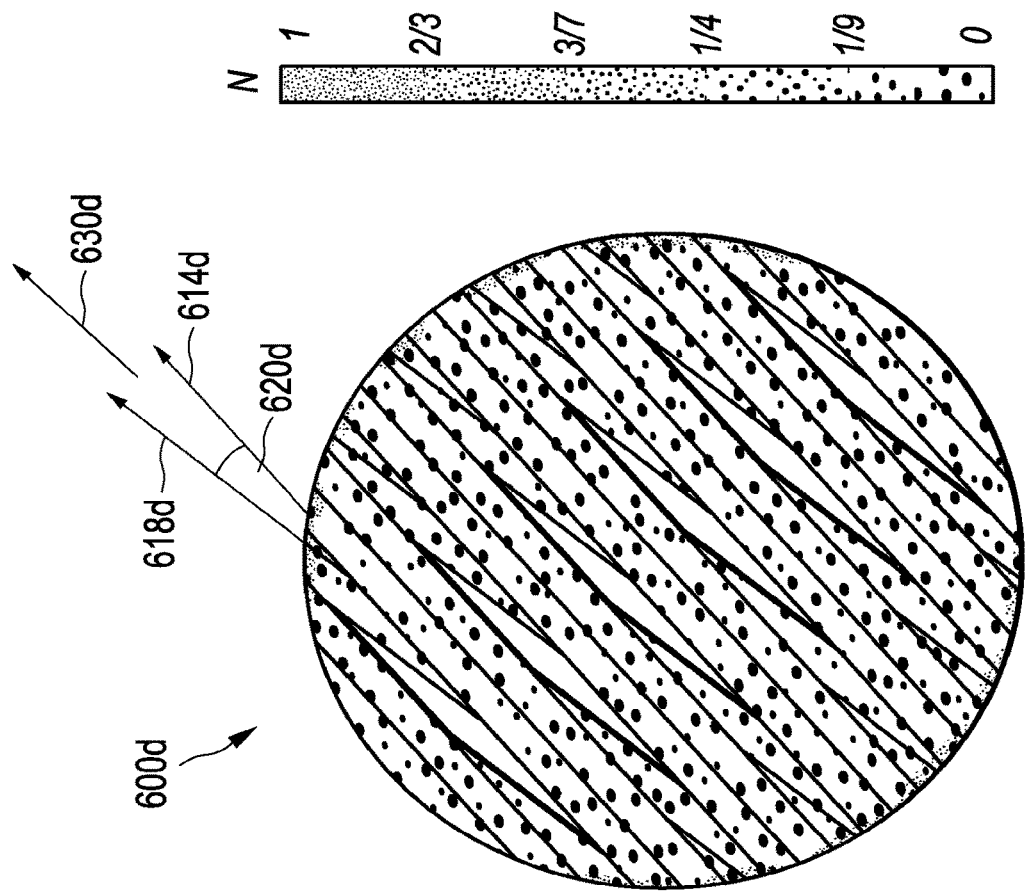
Figure 6C:
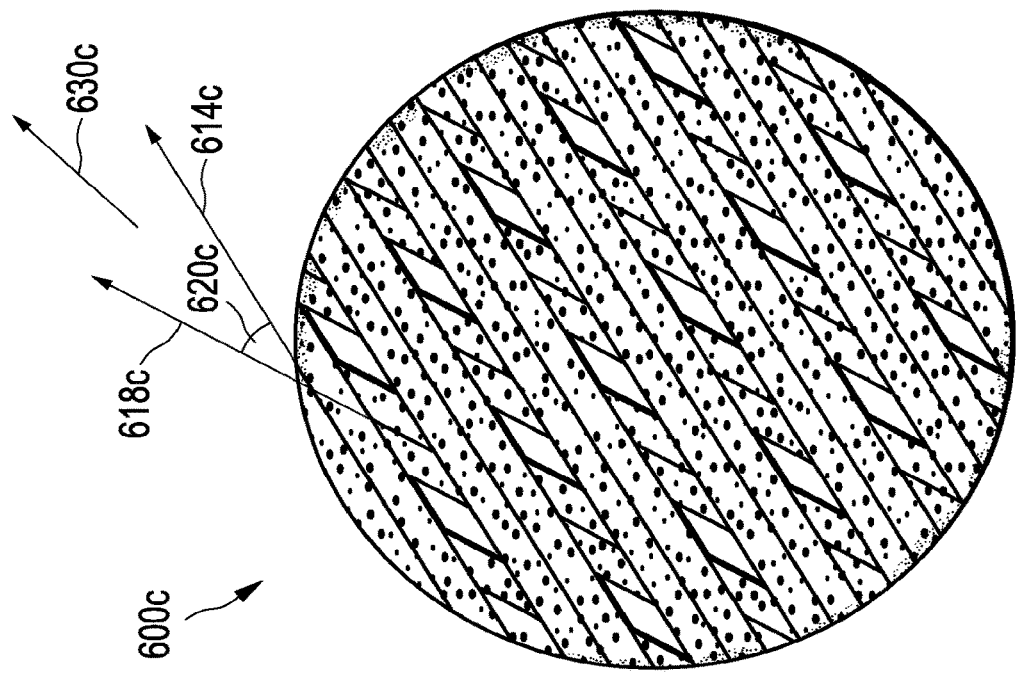
Figure 7:
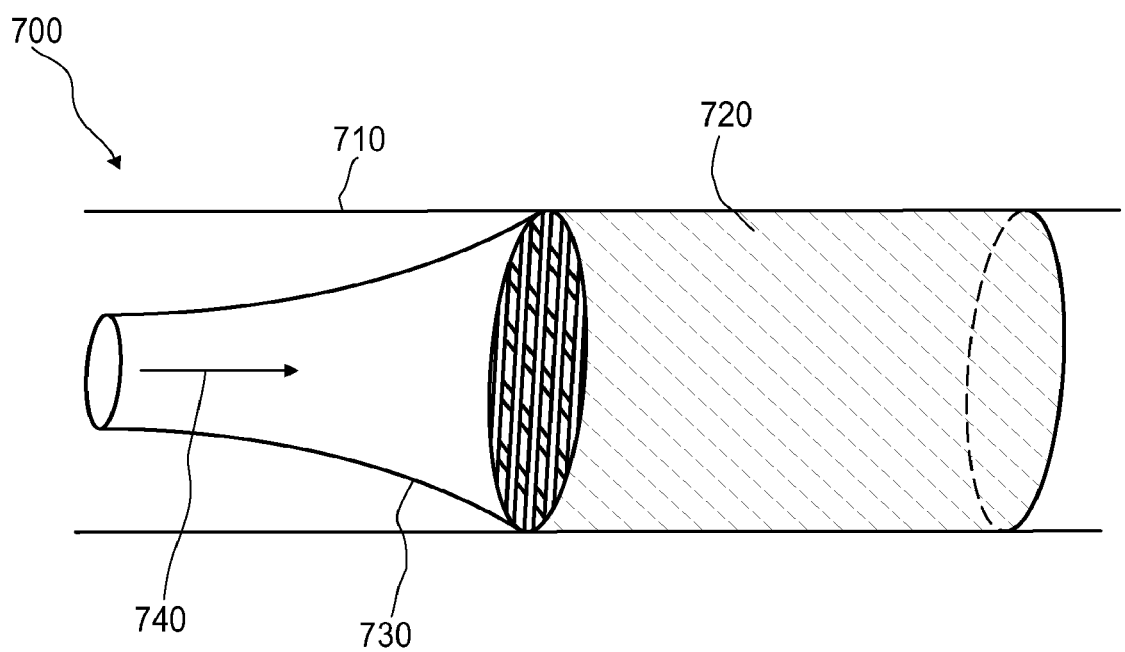
Figure 8:
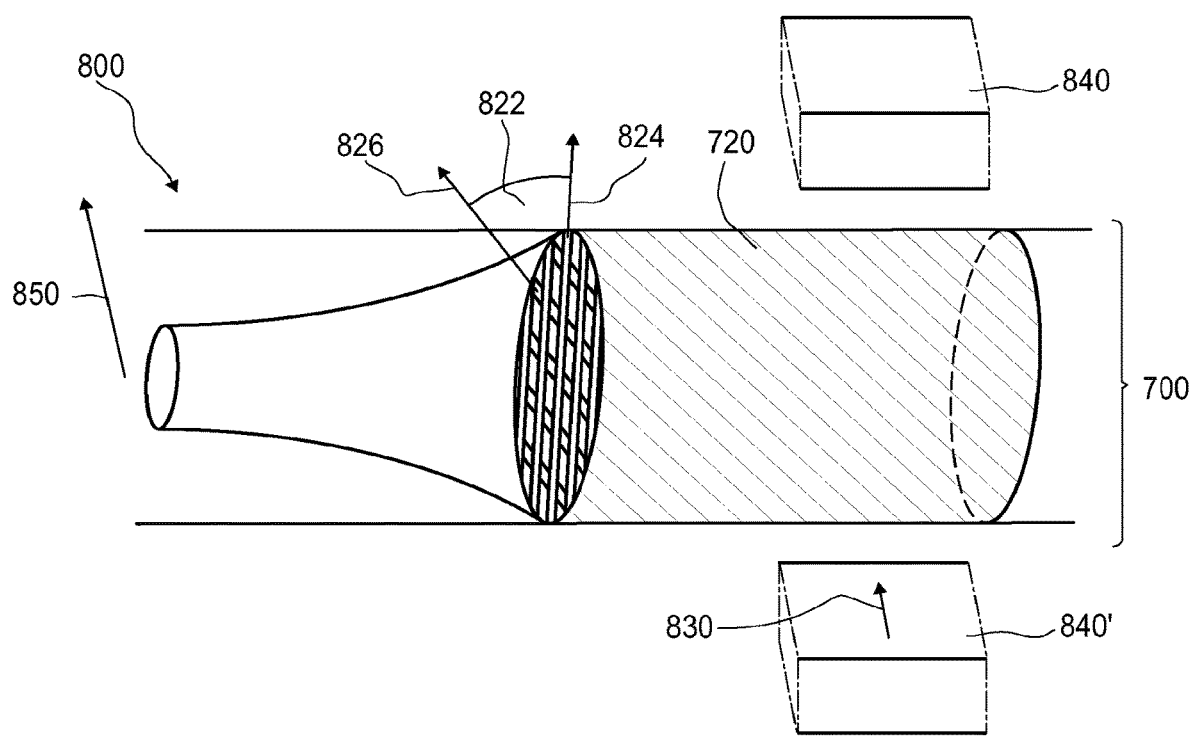
Figure 9:
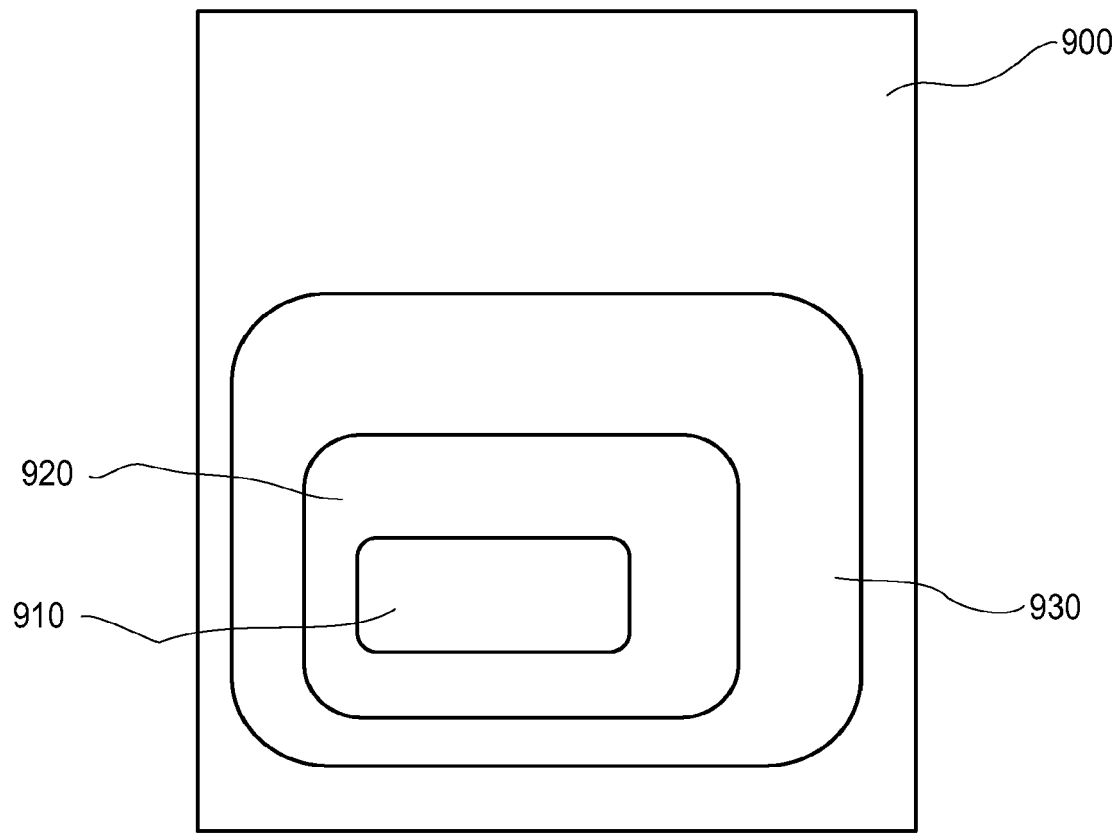
Figure 10:
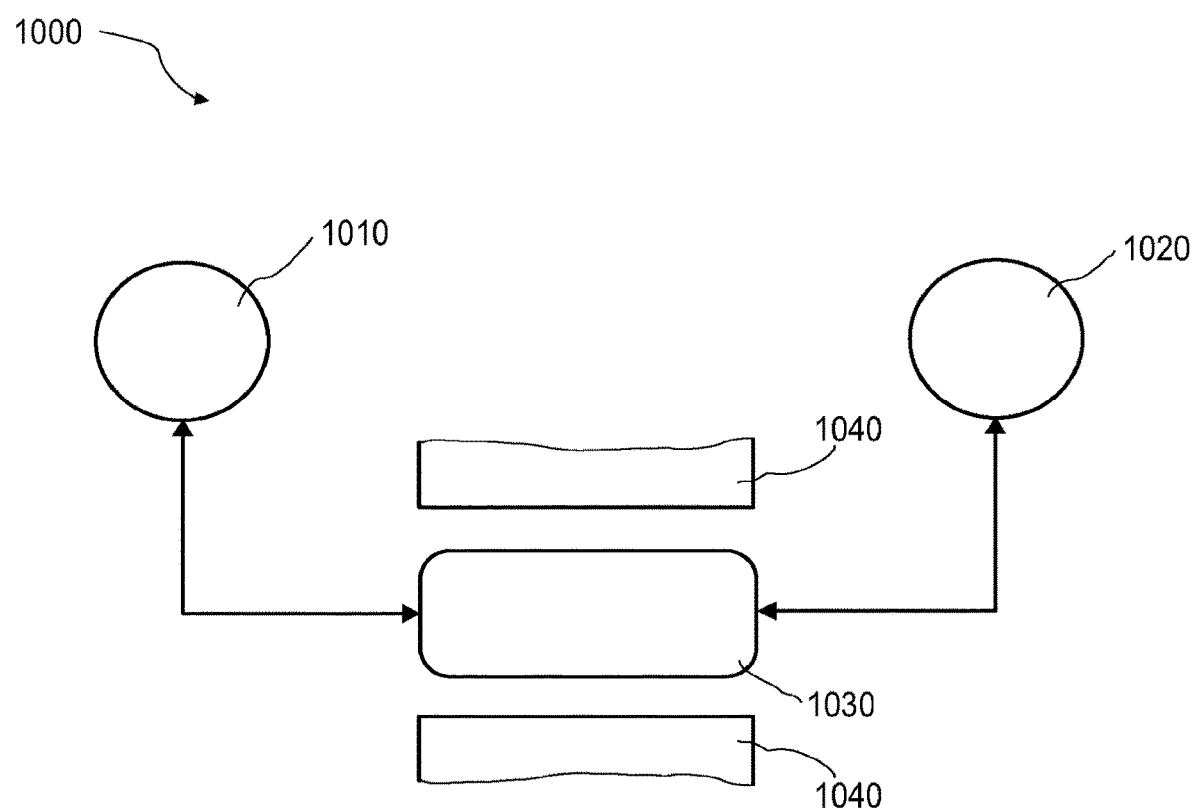
Figure 11:
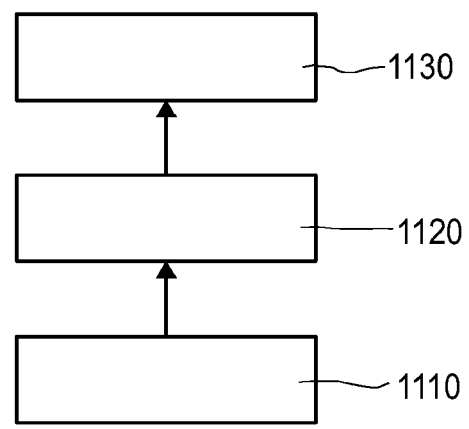

In the drawings:

FIG. 1 shows an embodiment of a magnetocaloric lattice element according to the first aspect of the invention, FIG. 2 shows another embodiment of a magnetocaloric lattice element according to the first aspect of the invention, FIG. 3 shows another embodiment of a magnetocaloric lattice element according to the first aspect of the invention, FIGS. 4*a, b* show further embodiments of a magnetocaloric lattice element according to the first aspect of the invention, FIG. 5 shows an embodiment of a single fibre of a magnetocaloric lattice element according to the first aspect of the invention, FIGS. 6*a-d* show further embodiments of a magnetocaloric lattice element according to the first aspect of the invention, FIG. 7 shows an embodiment of a magnetocaloric regenerator according to the second aspect of the invention, FIG. 8 shows an embodiment of a magnetocaloric heat pump according to the third aspect of the invention, FIG. 9 shows a schematic illustration of an embodiment of a cooling device according to the fourth aspect of the invention, FIG. 10 shows a schematic illustration of an embodiment of a magnetocaloric power generator according to the fifth aspect of the invention, FIG. 11 shows an embodiment of a method for operating a magnetocaloric heat pump according to the sixth aspect of the invention.

FIG. 1 shows an embodiment of a magnetocaloric lattice element 100 according to the first aspect of the invention. As illustrated, the magnetocaloric lattice element 100 is formed by fibres 105', 105" of magnetocaloric material, wherein the fibres 105', 105" are arranged in two respective parallel and planar lattice planes 134, 138, each fibre 105', 105" having a respective one of two longitudinal directions 114, 118 and a respective mass of magnetocaloric material. The depicted fibres 105', 105" of the magnetocaloric lattice element 100 exhibit an extension (diameter) of between 50 μm and 800 μm in a direction perpendicular to their longitudinal fibre extension. All fibres belong to a first or second set of fibres 105', 105" and the fibres of the first set of fibres 105' all extend along a common first longitudinal direction 114 of fibre extension and the fibres of the second set of fibres 105" all extend along a common second longitudinal direction 118 of fibre extension different from the first longitudinal direction 114.

Furthermore, since the set of fibres 105' on one hand and the set of fibres 105" on the other hand, in their respective lattice plane 134, 138, are parallel to each other, they do not contact each other, but each fibre 105' of the given lattice plane 134 is attached to fibres 105" in the other lattice plane 138, and vice versa. The attachment points of a given fibre are the crossing points of the given fibre with other fibres of one of its next neighboring lattice planes. Except for fibres in outermost lattice planes (top and bottom of the magnetocaloric lattice element) each lattice plane has two next neighbouring lattice planes, and there are contact points for each fibre of a given lattice plane to other fibres in both next neighboring lattice planes. The contact points provide for an attachment of the fibres to each other and thus achieve mechanical stability of the packed-screen structure as a whole. A lattice angle 110 between the first longitudinal direction 114 and the second longitudinal direction 118 is a sharp angle between 40° and 60°. The resulting rhombic structure of the magnetocaloric lattice element 100 exhibits exactly one predominant mass-weighted direction 140 of longitudinal fibre extension, which is oriented along a bisector of the sharp lattice angle 110.

While the rhombic structure shows the predominant mass-weighted direction 140 of longitudinal fibre extension intuitively, a quantitative way to understand the orientation of the predominant mass-weighted direction 140 will be given in the context of FIG. 5 further below.

FIG. 2 shows an embodiment of a magnetocaloric lattice element 200 according to the first aspect of the invention.

All fibres 205', 205" belong to a first or second set of fibres and the fibres of the first set of fibres 205' all extend along a common first longitudinal direction 214 of fibre extension and the fibres of the second set of fibres 205" all extend along a common second longitudinal direction 218 of fibre extension perpendicular to the first longitudinal direction 214.

A total number of fibres in the first set of fibres 205' is smaller than a total number of fibres in the second set of fibres 205". As a result, the first set of fibres 205' includes a smaller mass amount of magnetocaloric material than the second set of fibres 205".

This design measure achieves that the predominant mass-weighted direction 240 of longitudinal fibre extension is oriented along the second longitudinal direction 218. As mentioned above, the determination of the predominant mass-weighted direction 240 of longitudinal fibre extension is explained quantitatively in the context of FIG. 5.

FIG. 3 shows a further embodiment of a magnetocaloric lattice element 300 according to the first aspect of the invention.

As in the embodiment of FIG. 2, all fibres 305', 305" belong to either a first or a second set of fibres, and the fibres of the first set of fibres 305' all extend along a common first longitudinal direction 314 of fibre extension, and the fibres of the second set of fibres 305" all extend along a common second longitudinal direction 318 of fibre extension, which is perpendicular to the first longitudinal direction 314. However, in the present embodiment, a lateral extension of the fibres of the first set of fibres 305' is at least two times smaller than a lateral extension of the fibres of the second set of fibres 305", as determined for instance by considering their cross-sectional surface area having a surface vector parallel to the longitudinal extension of the respective fibres.

By virtue of this design, the predominant mass-weighted direction 340 of longitudinal fibre extension is oriented along the second longitudinal direction 318. The determination of the orientation of the predominant mass-weighted direction 340 of longitudinal fibre extension is explained quantitatively in the context of FIG. 5.

In an embodiment not shown, the lateral extension of the fibres of the first set of fibres is between four and eight times smaller than the lateral extension of the fibres of the second set of fibres.

Figure 4B:
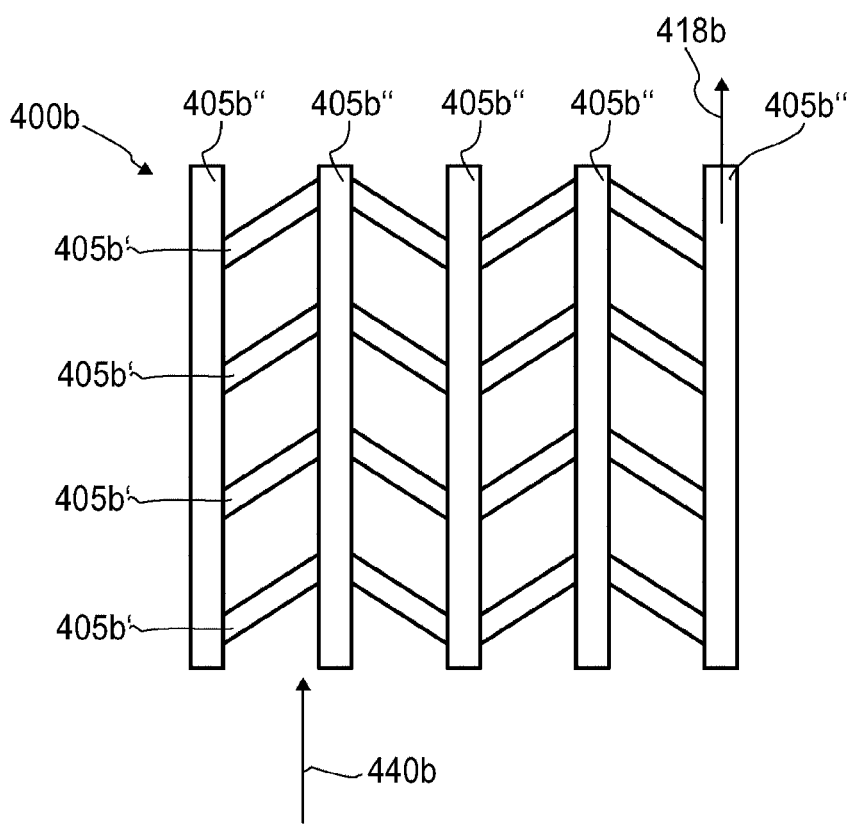

FIG. 4*a* and FIG. 4*b* show two further embodiments of a magnetocaloric lattice element 400*a*, 400*b* according to the first aspect of the invention. The structure of the illustrated embodiment is similar to those shown in FIG. 1 and FIG. 2. Fibres of the first set of fibres 405*a*', 405*b*' extend in parallel to each other, but in contrast to the earlier embodiments they are not straight. They exhibit a curved, cosine-type (FIG. 4*a*) or saw-tooth-type (FIG. 4*b*) or zigzag line shape along their longitudinal extension. In fabrication, the saw-tooth shape is typically made with a certain radius of curvature at points of attachment with the fibres 405*b*" of the second set of fibres.

Therefore, there is not a common first longitudinal direction for the fibres of these first sets of fibres in FIGS. 4*a* and 4*b*. In contrast, the fibres of the second set of fibres 405*a*", 405*b*" are in the shape of straight lines and have a common second longitudinal direction of fibre extension 418*a*, 418*b*.

The predominant mass-weighted direction 440*a*, 440*b* of longitudinal fibre extension is in both embodiments oriented along the second longitudinal direction 418*a*, 418*b*. The determination of the orientation of the predominant mass-weighted direction 440*a*, 440*b* of longitudinal fibre extension is explained quantitatively in the context of FIG. 5.

In an embodiment not shown, no fibres are arranged parallel to each other, so that there is not a common first or second longitudinal direction.

FIG. 5 shows an embodiment of two single fibres 500, 510 of a magnetocaloric lattice element according to the first aspect of the invention. The fibres are not straight, so that they cannot be said to extend in a fixed longitudinal direction.

FIG. 5 illustrates the concept of determination of the orientation of the predominant mass-weighted direction for a magnetocaloric lattice element. The determination includes partitioning the fibres 500, 510 into longitudinal fibre segments 505, 515 each having a segment mass $m_n$ and a longitudinal segment extension along a respective longitudinal segment direction $\vec{a}_n$, with n=1, . . . , 8. Such partitioning into fibre segments can be achieved easily by modern computer-aided design tools using a computer model of the magnetocaloric lattice elements. The partitioning serves to break down a given fibre into fibre segments along its longitudinal extension. The size of the segments along the longitudinal extension can be chosen using the following considerations: For each of the fibre segments, a single direction of longitudinal extension shall be determined. An optimum partitioning provides an exact direction of longitudinal extension for each fibre segment. However, achieving the optimum partitioning may not be required, and an inaccuracy of a certain angular range may be acceptable in the determination of the respective directions.

Knowing the material properties of the magnetocaloric fibres (mass per volume) and the geometrical extensions of the fibres and their fibre segments, these finite longitudinal fibre segments 505, 515, the predominant mass-weighted direction 540 of longitudinal fibre extension for the two fibres 500, 510 can be determined by finding a direction $\vec{e}_{PMD}$ that satisfies the following relation:

$$\vec{e}_{PMD} = \left\{ \vec{e_D} : |\vec{e_D}| = 1;\, f(\vec{e} = \vec{e_D}) = \max\left(\sum_n m_n \vec{a}_n \cdot \vec{e}\right) \right\}.$$

This is Eq. (1) and the corresponding variables were already explained above.

Thus, the relation given above defines in a mathematical way the fact that the predominant mass-weighted direction 540 of longitudinal fibre extension is exactly that direction of all directions, which in a mathematical representation is that vector with length 1, for which a weighted sum of all scalar projections of the respective longitudinal segment extensions of all fibre segments onto this predominant direction of longitudinal fibre extension assumes a maximum value. According to the invention, there exists exactly one such direction. To simplify the illustration, just one scalar projection 550 is shown in FIG. 5 for the longitudinal fibre segment n=3 and the corresponding scalar projection $\vec{a}_3 \cdot \vec{e}_{PMD}$.

Considering the partitioning of fibres into longitudinal fibre sections, such a partitioning is chosen to be precise enough for essentially finding the predominant mass-weighted direction of longitudinal fibre extension. A partitioning into a finite number of longitudinal fibre sections is sufficient to determine the predominant mass-weighted direction of longitudinal fibre extension.

FIGS. 6*a*, 6*b*, 6*c* and 6*d* show further embodiments of a magnetocaloric lattice element 600*a*, 600*b*, 600*c*, and 600*d* according to the first aspect of the invention. The Figures each show a respective schematic view of a section of a magnetocaloric lattice element and are not drawn to scale. In particular, the numbers of fibres of the respective magnetocaloric lattice elements in the paper plane is typically much larger than that covered by the respective section shown. Furthermore, the views in FIGS. 6*a* to 6*d* each cover only two neighbouring lattice planes, neighbouring in a direction perpendicular to the paper plane of the respective Figures. Actual embodiments have a much larger number of lattice planes stacked in this direction. The graphical representation of the sections shown has a circular outer shape in order to restrict the illustration to the essential feature of the structure in the context of the present invention. Thus, the circular shape does not necessarily reflect an actual outer shape of the respective magnetocaloric lattice element, which can have any outer shape suitable for a given application case. The respective magnetocaloric lattice elements form packed-screen type magnetocaloric lattice elements and have further lattice planes stacked in the direction perpendicular to the paper plane.

These embodiments are similar to the magnetocaloric lattice element 100 shown in FIG. 1. A porosity of the respective magnetocaloric lattice element 600*a*, 600*b*, 600*c*, 600*d*, i.e., the relation between the volume of the magnetocaloric material of the fibres divided by a total volume of the magnetocaloric lattice element, amounts to the same value of 0.4764 for all four embodiments of FIGS. 6*a* to 6*d*.

FIG. 6*a* shows a magnetocaloric lattice element 600*a* wherein a lattice angle 620*a* between the first longitudinal direction 614*a* and the second longitudinal direction 618*a* is a sharp angle of 70°. The resulting rhombic structure of the magnetocaloric lattice element 600*a* exhibits exactly one predominant mass-weighted direction 630*a* of longitudinal fibre extension, which is oriented along a bisector of the sharp lattice angle 620*a*. A gray-scaled tone of the fibres visualizes a demagnetizing factor N of the magnetocaloric lattice element 600*a*, which is 14% smaller than in the case of a corresponding reference magnetocaloric lattice element of the same porosity with fibres in a perpendicular arrangement (not shown).

FIG. 6*b* shows another variant of a magnetocaloric lattice element 600*b*, wherein a lattice angle 620*b* between the first longitudinal direction 614*b* and the second longitudinal direction 618*b* is a sharp angle of 50°. The resulting rhombic structure of the magnetocaloric lattice element 600*b* exhibits exactly one predominant mass-weighted direction 630*b* of longitudinal fibre extension, which is oriented along a bisector of the sharp lattice angle 620*b*. The gray-scaled tone of the fibres indicates a demagnetizing factor N of the magnetocaloric lattice element 600*b*, which is even further reduced in comparison with the magnetocaloric lattice element of FIG. 6*a*, namely, 27% smaller than in the case of the reference magnetocaloric lattice element.

FIG. 6*c* shows a further variant of a magnetocaloric lattice element 600*c*, wherein a lattice angle 620*c* between the first longitudinal direction 614*c* and the second longitudinal direction 618*c* is a sharp angle of 30°. The resulting rhombic structure of the magnetocaloric lattice element 600*c* exhibits exactly one predominant mass-weighted direction 630*c* of longitudinal fibre extension, which is oriented along a bisector of the sharp lattice angle 620*c*. The gray-scaled tone of the fibres indicates a demagnetizing factor N of the magnetocaloric lattice element 600*c*, which is even further reduced in comparison with the magnetocaloric lattice element of FIG. 6*b*, namely, 37% smaller than in the case the reference magnetocaloric lattice element.

FIG. 6*d* shows a magnetocaloric lattice element 600*d*, wherein a lattice angle 620*d* between the first longitudinal direction 614*d* and the second longitudinal direction 618*d* is a sharp angle of 10°. The resulting rhombic structure of the magnetocaloric lattice element 600*d* exhibits exactly one predominant mass-weighted direction 630*d* of longitudinal fibre extension, which is oriented along a bisector of the sharp lattice angle 620*d*. The gray-scaled tone visualizes a demagnetizing factor N of the magnetocaloric lattice element 600*c*, which is even further reduced in comparison with the magnetocaloric lattice element of FIG. 6*c*, namely, 43% smaller than in the case of the reference magnetocaloric lattice element.

FIGS. 6*a*, 6*b*, 6*c* and 6*d* show that small sharp lattice angles achieve a strong reduction of the demagnetizing effect in the magnetocaloric lattice element. On the other hand, the positive effect regarding demagnetization with decreasing lattice angles 620*a*, 620*b*, 620*c*, 620*d* is accompanied by an increase in pressure loss of a heat transfer medium that is guided through the pores of the respective magnetocaloric lattice elements 600*a*, 600*b*, 600*c*, 600*d* within a cooling device. A high pressure loss is usually not desired. Both effects have to be taken into account and balanced in the design of a magnetocaloric lattice element that is optimally suited for a given application scenario.

FIG. 7 illustrates an embodiment of a magnetocaloric regenerator 700 according to the second aspect of the invention. The magnetocaloric regenerator 700 comprises a regenerator housing 710, a magnetocaloric lattice element 720 in the regenerator housing 710, and a fluid channel system 730 configured to guide a flow of a fluid 740 through the magnetocaloric lattice element 720. In this embodiment, the magnetocaloric lattice element 720 is similar to the magnetocaloric lattice element 600*a* shown in FIG. 6*a*.

FIG. 8 shows an embodiment of a magnetocaloric heat pump 800 according to the third aspect of the invention. The magnetocaloric heat pump 800 comprises the magnetocaloric regenerator 700 shown in FIG. 7 with the magnetocaloric lattice element 720, and a magnet assembly 840, 840' at a ring-shaped rotatable support structure (not shown) for applying an external magnetic field to the magnetocaloric lattice element 720. The magnetocaloric lattice element 720 and the magnet assembly 840, 840' are mutually arranged for providing the external magnetic field to the magnetocaloric lattice element 720 with a field direction 830, which is parallel to the predominant mass-weighted direction 850 of longitudinal fibre extension of the magnetocaloric lattice element 720. The magnetic field is preferably substantially homogeneous at least in the volume assumed by the magnetocaloric lattice element 720.

In this embodiment, all fibres of the magnetocaloric lattice element 720 have a same respective mass amount of magnetocaloric material, and the magnetocaloric lattice element 720 and the magnet assembly 840, 840' are configured to be mutually arranged for applying the external magnetic field to the magnetocaloric lattice element 720 with a field direction 830 which is oriented along a bisector of the sharp lattice angle 822 between the first longitudinal direction 824 and the second longitudinal direction 826. The bisector is oriented along the predominant mass-weighted direction 850 of longitudinal fibre extension.

In a similar embodiment not shown, the first longitudinal direction of the fibres of the magnetocaloric lattice element is perpendicular to the second longitudinal direction, as shown in FIGS. 2 and 3, and the magnetocaloric lattice element and the magnet assembly are configured to be mutually arranged for applying the external magnetic field to the magnetocaloric lattice element with a field direction which is oriented along the second longitudinal direction which forms the predominant mass-weighted direction of longitudinal fibre extension.

FIG. 9 shows a schematic illustration of an embodiment of a cooling device 900 according to the fourth aspect of the invention. The cooling device 900 comprises a magnetocaloric lattice element 910 according to the first aspect of the invention, which is arranged within a magnetocaloric regenerator 920 according to an embodiment of the second aspect of the invention. The magnetocaloric regenerator 920 is arranged within a magnetocaloric heat pump 930 according to an embodiment of the third aspect of the invention, which in operation pumps heat out of the cooling device 900 into an ambient environment and thus effectively cools the cooling device 900. The pumping of heat out of the cooling device 900 comprises a process cycle including a magnetization and demagnetization of the magnetocaloric lattice element 910, as already explained above.

FIG. 10 shows a schematic illustration of an embodiment of a magnetocaloric power generator 1000 according to the fifth aspect of the invention. The magnetocaloric power generator 1000 comprises a heating reservoir 1010 and a cooling reservoir 1020, which are arranged and configured to heat and cool a magnetocaloric lattice element 1030 to change its magnetic field periodically. Furthermore, the magnetocaloric power generator 1000 comprises a permanent magnet 1040, which is arranged at the magnetocaloric lattice element 1030 in order to provide an electrical current which is induced by changes in the magnetic field of the magnetocaloric lattice element 1030. In the magnetocaloric lattice element 1030, fibres of magnetocaloric material are arranged in lattice planes, which are stacked parallel to each other. The fibres of any given lattice plane do not contact each other but the fibres of the given lattice plane each contact at least two respective other fibres of a next neighbouring lattice plane. The magnetocaloric lattice element exhibits exactly one predominant mass-weighted direction of longitudinal fibre extension. The predominant mass-weighted direction of longitudinal fibre extension is in parallel with a field direction of the permanent magnet 1040.

FIG. 11 shows an embodiment of a method for operating a magnetocaloric heat pump according to the sixth aspect of the invention.

The method comprises as a first step 1110 a providing of a magnetocaloric lattice element according to at least one embodiment according to the first aspect of the invention.

The second step 1120 of the method is a providing of a magnet assembly for applying an external magnetic field to the magnetocaloric lattice element.

And the final step 1130 is an arranging of the magnetocaloric lattice element and of the magnet assembly for applying the external magnetic field to the magnetocaloric lattice element with a field direction which is parallel to the predominant mass-weighted direction of longitudinal fibre extension.

In summary, the invention relates to a magnetocaloric lattice element formed by fibres of magnetocaloric material, wherein the fibres are arranged in respective parallel lattice planes, each fibre having a respective mass of magnetocaloric material, the fibres of a given lattice plane do not contact each other but each fibre of a given lattice plane is attached to at least two fibres in a next neighbouring lattice plane, and wherein the magnetocaloric lattice element exhibits exactly one predominant mass-weighted direction of longitudinal fibre extension.

The invention is not limited to the disclosed embodiments. In particular the invention is not restricted to the use of particular shapes of fibres, or to just two longitudinal directions of fibre extension, or to a using of the magnetocaloric lattice element with a cooling device. The invention is furthermore not restricted to combinations with a magnet assembly.

Any reference signs in the claims should not be construed as limiting the scope.

The invention claimed is:

1. A magnetocaloric heat pump comprising:
    a housing containing a magnetocaloric element,
    the magnetocaloric element comprising a plurality fibers each having a respective mass amount of magnetocaloric material and exhibiting exactly one predominant mass-weighted direction,
        the plurality of fibers comprising a first set of fibers arranged in a first lattice plane and a second set of fibers arranged in a second lattice plane, wherein each fiber of the first set of fibers has a length extending in a common first direction and is spaced a distance apart from each of the other fibers in the first lattice plane, and each fiber of the second set of fibers has a length extending in a common second direction and is spaced a distance apart from each of the other fibers in the second lattice plane,
        the common first direction and the common second direction are arranged with an acute lattice angle therebetween, and the predominant mass-weighted direction is oriented along a bisector of the acute lattice angle,
        a plurality of each of the first and second sets of fibers arranged in respective first and second lattice planes, the first and second lattice planes arranged in parallel and alternatingly such that each fiber of a respective first lattice plane is attached to at least two fibers of an adjacent second lattice plane, and
    an external support structure comprising a magnet assembly having a magnetic field external to the magnetocaloric element with a field direction,
        wherein the field direction is parallel to the predominant mass-weighted direction and along the bisector of the acute lattice angle; and
    wherein the magnetocaloric element has a volume, and the magnetic field is homogenous in at least the volume of magnetocaloric element.

2. The magnetocaloric heat pump of claim 1, further comprising a control unit configured to control an orientation of the magnet assembly with respect to an orientation of the magnetocaloric element.

3. The magnetocaloric heat pump of claim 2, wherein the control unit comprises a processor configured to compare the orientation of the magnet assembly with respect to reference values stored on the processor.

4. The magnetocaloric heat pump of claim 2, wherein the control unit comprises a processor configured to compare the orientation of the magnetocaloric element with respect to reference values stored on the processor.

5. The magnetocaloric heat pump of claim 2, wherein the control unit comprises a visual indicator for manual adjustment of the orientation of one or both of the magnet assembly and the magnetocaloric element.

6. The magnetocaloric heat pump of claim 2, wherein the control unit is configured to execute a periodic movement of the magnetocaloric element relative to the magnet assembly.

7. The magnetocaloric heat pump of claim 1, further comprising a magnetocaloric regenerator.

8. The magnetocaloric heat pump of claim 1, further comprising a fluid channel system.

9. The magnetocaloric heat pump of claim 1, wherein the plurality of fibers all have the same respective mass amount of magnetocaloric material.

10. The magnetocaloric heat pump of claim 1, wherein the plurality of fibers are all equally sized.

11. The magnetocaloric heat pump of claim 1, wherein the magnetocaloric element has a rhombic structure.

12. The magnetocaloric heat pump of claim 1, wherein the acute lattice angle is in a range of 10° to 70°.

13. A magnetocaloric heat pump comprising:
    a housing containing a magnetocaloric element,
    the magnetocaloric element comprising a plurality fibers each having a respective mass amount of magnetocaloric material and exhibiting exactly one predominant mass-weighted direction,
        the plurality of fibers comprising a first set of fibers arranged in a first lattice plane and a second set of fibers arranged in a second lattice plane, wherein each fiber of the first set of fibers has a length extending in a common first direction and is spaced a distance apart from each of the other fibers in the first lattice plane, and each fiber of the second set of fibers has a length extending in a common second direction and is spaced a distance apart from each of the other fibers in the second lattice plane,
        the common first direction is arranged perpendicular to the common second direction, and the predominant mass-weighted direction is oriented along the common second direction,
        a plurality of each of the first and second sets of fibers arranged in respective first and second lattice planes, the first and second lattice planes arranged in parallel and alternatingly such that each fiber of a respective first lattice plane is attached to at least two fibers of an adjacent second lattice plane, and an external support structure comprising a magnet assembly having a magnetic field external to the magnetocaloric element with a field direction, wherein the field direction is parallel to the predominant mass-weighted direction; and wherein the magnetocaloric element has a volume, and the magnetic field is homogenous in at least the volume of magnetocaloric element.

14. The magnetocaloric heat pump of claim 13, wherein each fiber in the first set of fibers has a respective first width in a direction perpendicular to the common first direction, each fiber in the second set of fibers has a respective second width in a direction perpendicular to the common second direction, and the respective second width is larger than the respective first width.

15. The magnetocaloric heat pump of claim 13, wherein a number of fibers in the second set of fibers is larger than a number of fibers in the first set of fibers.

16. The magnetocaloric heat pump of claim 13, wherein the respective mass amount of magnetocaloric material of each fiber in the second set of fibers is greater than the respective mass amount of magnetocaloric material of each fiber in the first set of fibers.

* * * * *